May 15, 1951  G. L. CAMARERO  2,553,237
SHOCK ABSORBER

Filed Jan. 11, 1946  2 Sheets-Sheet 1

INVENTOR
GEORGE L CAMARERO
BY
ATTORNEY

May 15, 1951     G. L. CAMARERO     2,553,237
SHOCK ABSORBER
Filed Jan. 11, 1946     2 Sheets-Sheet 2
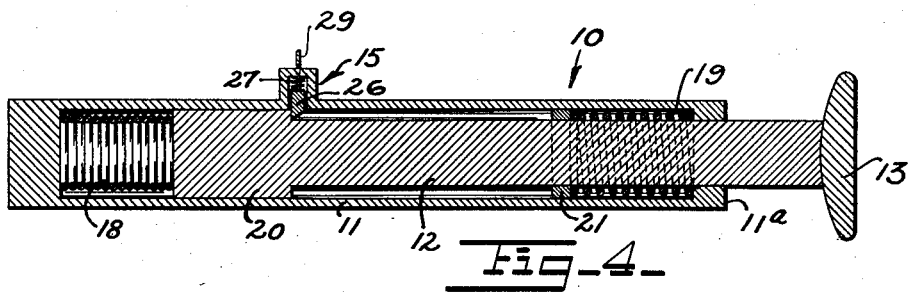
Fig-4-
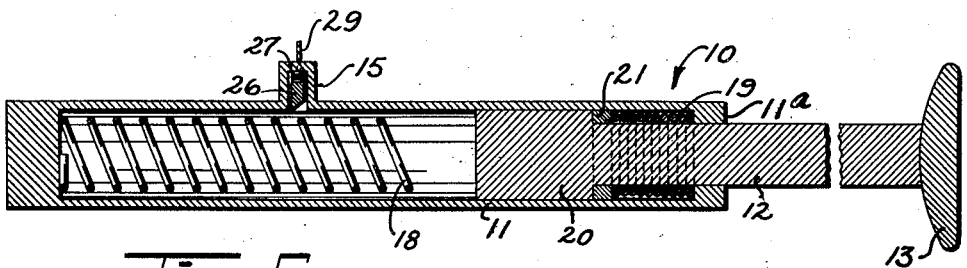
Fig-5-
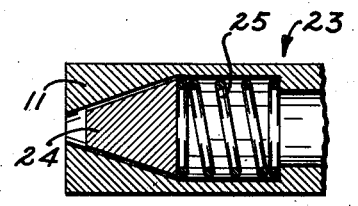
Fig-7-
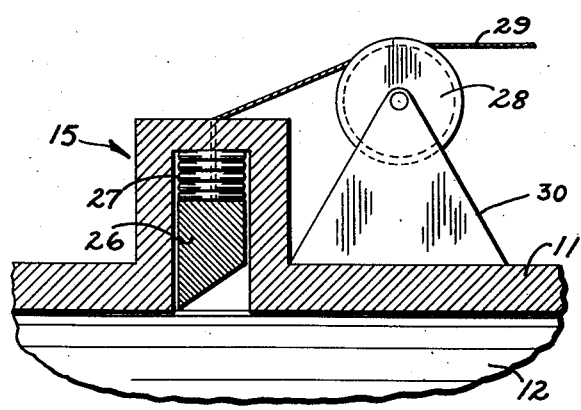
Fig-8-
INVENTOR
GEORGE L. CAMARERO
BY
ATTORNEY Patented May 15, 1951

2,553,237

UNITED STATES PATENT OFFICE 2,553,237

SHOCK ABSORBER

George L. Camarero, New York, N. Y.

Application January 11, 1946, Serial No. 640,486

5 Claims. (Cl. 267—1)

This invention relates in general to apparatus for receiving and absorbing mechanical shock, and particularly to a combined spring and fluid shock absorber.

According to this invention there is provided a shock absorber which is adapted to receive a relatively high mechanical shock and to distribute the shock substantially smoothly over a relatively long period of time and over a relative long distance, utilizing a combination of a spring and a compressible gas to reduce the violence of the shock. According to an alternative form of the invention, the article utilizes the combined action of a spring and a relatively non-compressible liquid escaping through openings to reduce the violence of the shock.

It is an object of this invention to provide a shock absorbing apparatus to receive a mechanical shock and distribute the shock over a relatively long time whereby the violence of the shock is reduced.

It is a further object of this invention to provide a shock absorber as set forth according to the previous object, the shock absorber utilizing the shock absorbing qualities of a spring combined with the shock absorbing qualities of a fluid.

Additional objects of this invention as well as the use, construction and operation of the shock absorber will become obvious from the following disclosure.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a longitudinal cross section of the device shown in Fig. 1, taken along the line 4—4 and showing the internal position of parts with the device in the compressed position.

Fig. 5 is a longitudinal cross section of the device shown in Fig. 2, taken along the line 5—5 and showing the internal position of parts with the device in the extended position.

Fig. 7 is a side elevation in cross section of a valve arrangement on the device according to Fig. 1, taken along the line 7—7.

Fig. 8 is an enlarged view of a release mechanism according to Figs. 1 to 5.

Figure 1:
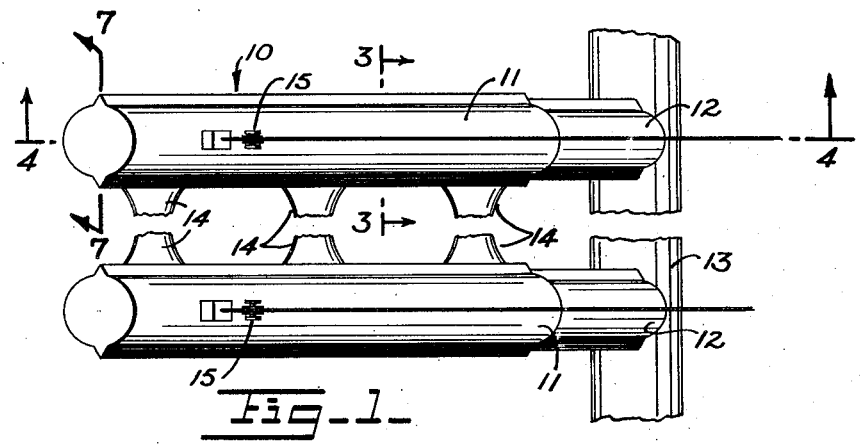
Fig. 1 is a perspective view of the device according to one form of the invention, and with the device in the compressed or normal position.
Figure 2:
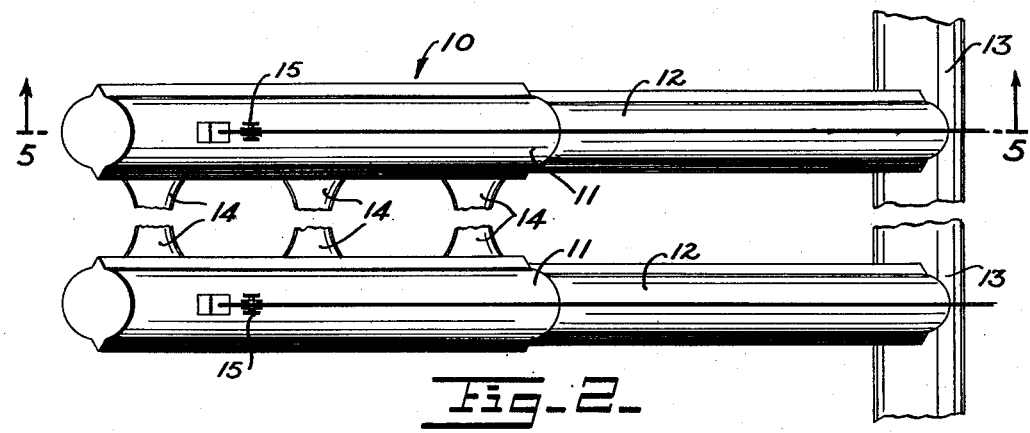
Fig. 2 is a perspective view of the device shown in Fig. 1 and with the device in the extended or shock receiving position.

Referring to the figures in detail, in Figs. 1 and 2 is shown a shock absorber generally designated 10 according to one form of this invention. This shock absorber comprises generally two barrels 11 or tubes, having a plunger 12 extending from the forward end of each tube, with a ram or bumper 13 mounted across the ends of the plungers. Between the tubes 11 are a series of braces 14 which secure the tubes together and add structural strength to the device. Mounted on each of the tubes is a release mechanism generally designated 15 which will be further described hereinafter. Along the sides of the tubes are a pair of ridges whose purpose and construction will likewise be hereinafter described.

In Fig. 1, this device is shown in its normal position as it is mounted and carried on a moving body or the like, and in Fig. 2 the same device is shown in the "ready" or extended position in which it is placed immediately prior to an anticipated shock. In this latter position the plungers are extended, carrying the bumper forward to receive a mechanical shock in a condition to distribute the shock over a comparatively long linear distance and accordingly over a relatively long time.

Figure 3:
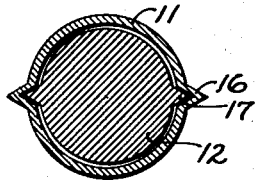
Fig. 3 is a cross sectional view of the barrel of one member of the device shown in Fig. 1, taken along the line 3—3.

In Fig. 3 is shown the cross section of the tube 11 and plunger 12, illustrating a means by which the plunger is kept substantially in the center of the tube while leaving a small space completely around the plunger to permit passage of the shock absorbing fluid past the plunger. An outwardly extending groove 16 in the tube receives a similarly positioned outwardly extending projection or ridge 17 on the plunger collar 20 (see Fig. 6) which prevents the plunger 11 from sinking to the bottom of the tube. The mating ridge and groove also serve to prevent jamming of the plunger and ensure constant satisfactory performance of the device. Optionally, the ridge 17 extends along both the collar 20 and the plunger body 12, in which case there is a groove at the front end 11ª of the tube; alternatively, the plunger body 11 has no ridge, in which case the end 11ª is smooth as shown in Figs. 4 and 5.

Figure 6:
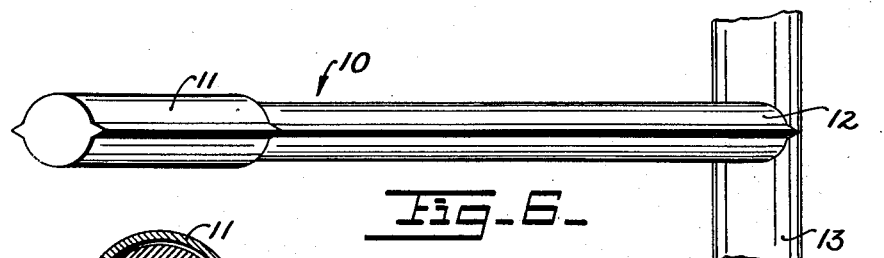
Fig. 6 is a perspective view of a plunger according to the previous figures.

In Figs. 4 and 5 are shown the device in the normal or closed condition and in the ready or open condition respectively, illustrating the structure and the operation of the device. Fig. 6, showing a perspective of the plunger assists in showing the details. The plunger 12 is slidably positioned within the tube 11, with a heavy spring 18 mounted within the tube and behind the plunger. In the closed position shown in Figs. 1 and 4, this spring is highly compressed by the plunger. The plunger is held in this position by means of locking means 15 (referred to in connection with Figs. 1 and 2, and described more fully hereinafter), which bears against a collar 20 on the plunger. At the front end of the tube 11 is a somewhat smaller and lighter spring 19, terminating at its rear end in a ring 21 which fits snugly but slidably around the plunger 12. In Fig. 5, the plunger is shown in a forward position within the tube 11, with collar 20 bearing against ring 21, and in this case actually compressing spring 19. This figure shows the position of the parts after holding mechanism 15 has been raised to release plunger 12, and the plunger has accordingly been shot to the forward end of the tube 11. Ring 21, in the course of this movement has softened the blow of the plunger at the forward end of the tube, and has prevented a shock as the plunger reached the end.

A series of vents in the sides of the tube 11 optionally permit the somewhat impeded passage of air, to permit the plunger to pass the length of the tube without building up a high air pressure within the tube. Likewise a valve in the rear of the tube (see Fig. 7) permits air or the shock absorber liquid to enter the tube behind the plunger as the plunger moves forward, and prevents the rapid exit of air as the plunger is urged rearward in the tube.

In Fig. 7 there is shown a simple valve 23 which is satisfactory to permit the passage of air or a liquid when the plunger is moving forward through the tube. The movement of the fluid causes a valve body 24 to be forced forward against a spring 25, causing the tapered sides of the valve body 24 to be pulled away from the tapered sides of the tube 11 which serve as the valve seat. Of course, it is understood that there may be used a valve of a more complex design to be substituted for this simple valve without departing from the scope of the invention.

In Fig. 8 is shown the hereinbefore referred to locking or holding mechanism by means of which the plunger is normally retained and is released to set the device to the ready position. The release 15 comprises a detent 26 which is slidably mounted in the tube 11 to project against plunger 12 and bear against collar 20 on the plunger. A spring 27 urges the detent firmly against the plunger to prevent accidental slipping. A chain or cord 29 or the like, passing over pulley 28 and extending to a control means located elsewhere serves to withdraw the detent and release the plunger at a desired moment. The control means may optionally be actuated manually or automatically, as desired. A support 30 mounts the pulley 28 on the tube 11.

In a pneumatic-spring shock absorber according to this invention, the device shown in any of the figures is mounted on a body to be protected, with the plunger and bumper aimed in the direction of the anticipated shock. Plungers 12 are retracted within the tubes 11 and secured in place by means of locking means 15. When a shock is imminent, means 15 is released by drawing on cord 29, thereby permitting spring 18 to project the plunger forward in the tube. The actual shock, impinging on the bumper 13 forces the plungers back compressing the air therebehind and finally compressing the spring 18, both of which compressions absorb the shock. Openings (if present) and the strength of spring 18 are pre-adjusted to absorb the shock smoothly and evenly, preferably about half of the impact being taken by the escaping and compressing air, while the other half is taken up by the spring.

When a hydraulic-spring shock absorber is desired, the tubes are mounted within a hydraulic chamber (not shown in the figures) containing a hydraulic liquid. The operation of the device is substantially the same in this case, except that with a hydraulic shock absorber a means for escaping fluid (holes 22) is invariably present instead of being optional as in the case of a pneumatic device.

The shock absorbing apparatus shown in the figures and described herein is admirably adapted to a wide variety of uses. For example, a shock absorber according to this invention may be mounted on a vehicle such as, for example, automobiles, locomotives, buses, elevators, steamers and the like. In this case, the device is substantially the same length as the vehicle, so that an unobtrusive, compact device will be provided to absorb a shock in a distance as long as possible. When the operator of the vehicle determines that the vehicle is headed to crash into another object, he releases the device which then proceeds to receive and absorb the shock. Similarly, this device may act as a buffer to receive and stop a falling object, preventing a damaging crash at the end of its descent. Numerous other uses for the device will be apparent to those skilled in the art.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a shock absorber, a substantially cylindrical tube, a plunger reciprocably mounted within said tube and having a reduced section projecting from one end of the tube and a collar section closely received within the tube, a driving spring positioned intermediate the opposite end of the tube and said collar section, a releasable detent mounted in said tube and engageable with said collar, a ring surrounding the reduced section of said plunger and adapted to be abutted by the collar section, and a cushioning spring surrounding the reduced section of said plunger and positioned intermediate the first end of said tube and said ring.

2. In a shock absorber, a substantially cylindrical tube, a plunger reciprocally mounted within said tube and having a reduced section projecting from one end of the tube and a collar section closely received within the tube, a driving spring positioned intermediate the opposite end of the tube and said collar section, a releasable detent mounted in said tube and engageable with said collar, said detent being mounted radially on said tube, a cable for operating said detent being secured to one end of said detent, a ring surrounding the reduced section of said plunger and adapted to be abutted by the collar section, and a cushioning spring surrounding the reduced section of said plunger and positioned intermediate the fixed end of said tube and said ring.

3. In a shock absorber, a substantially cylindrical tube, a plunger reciprocally mounted within said tube and having a reduced section projecting from one end of the tube and a collar section closely received within the tube, a driving spring positioned intermediate the opposite end of the tube and said collar section, a releasable detent mounted in said tube and engageable with said collar, said detent being mounted radially on said tube, a cable for operating said detent being secured to one end of said detent, a guide pulley for said cable mounted on said tube, said pulley having a groove formed therein receiving said cable, a ring surrounding the reduced section of said plunger and adapted to be abutted by the collar section, and a cushioning spring surrounding the reduced section of said plunger and positioned intermediate the fixed end of said tube and said ring.

4. In a shock absorber, a substantially cylindrical tube, a plunger reciprocally mounted within said tube and having a reduced section projecting from one end of the tube and a collar section closely received within the tube, a driving spring positioned intermediate the opposite end of the tube and said collar section, a releasable detent mounted in said tube and engageable with said collar, a casing slidably receiving said detent for radial movement with respect to the longitudinal axis of said tube, a compression spring mounted intermediate one end of said detent and said casing, said casing having an opening formed therein, a cable for operating said detent extending through said opening into said casing and having one of its ends secured to said detent, a ring surrounding the reduced section of said plunger and adapted to be abutted by the collar section, and a cushioning spring surrounding the reduced section of said plunger and positioned intermediate the fixed end of said tube and said ring.

5. In a shock absorber, a substantially cylindrical tube, a plunger reciprocally mounted within said tube and having a reduced section projecting from one end of the tube and a collar section closely received within the tube, a driving spring positioned intermediate the opposite end of the tube and said collar section, a releasable detent mounted in said tube and engageable with said collar, a casing slidably receiving said detent for radial movement with respect to the longitudinal axis of said tube, a compression spring mounted intermediate one end of said detent and said casing, said casing having an opening formed therein, a cable for operating said detent extending through said opening into said casing and having one of its ends secured to said detent, a guide pulley mounted on said tube, said pulley having a groove formed therein to receive said cable, a ring surrounding the reduced section of said plunger and adapted to be abutted by the collar section, and a cushioning spring surrounding the reduced section of said plunger and positioned intermediate the fixed end of said tube and said ring.

GEORGE L. CAMARERO.

REFERENCES CITED

The following references are of record in the file of this patent:

UNITED STATES PATENTS

| Number | Name | Date |
| --- | --- | --- |
| 1,570,624 | Dominguez | Jan. 26, 1926 |
| 1,655,976 | Schmidt | Jan. 10, 1928 |
| 1,664,342 | April | Mar. 27, 1928 |
| 1,702,675 | Ventura | Feb. 19, 1929 |
| 1,733,930 | Alland | Oct. 29, 1929 |
| 1,740,576 | Costaganna | Dec. 24, 1929 |
| 1,799,894 | Fritsch | Apr. 7, 1931 |
| 2,048,945 | Pascheka | July 28, 1936 |
| 2,090,659 | Zirmer et al. | Aug. 24, 1937 |
| 2,422,767 | Anderson | June 24, 1947 |